US011392489B2

(12) United States Patent
Lin et al.

(10) Patent No.: US 11,392,489 B2
(45) Date of Patent: Jul. 19, 2022

(54) DATA STORAGE DEVICE AND NON-VOLATILE MEMORY CONTROL METHOD

(71) Applicant: Silicon Motion, Inc., Jhubei (TW)

(72) Inventors: Ting-Han Lin, Zhubei (TW); Che-Wei Hsu, Taichung (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/774,207

(22) Filed: Jan. 28, 2020

(65) Prior Publication Data

US 2020/0394131 A1 Dec. 17, 2020

Related U.S. Application Data

(60) Provisional application No. 62/862,196, filed on Jun. 17, 2019.

(30) Foreign Application Priority Data

Oct. 15, 2019 (TW) .............................. 108136997

(51) Int. Cl.
*G06F 12/02* (2006.01)
*G06F 12/0815* (2016.01)
(Continued)

(52) U.S. Cl.
CPC ........ *G06F 12/0246* (2013.01); *G06F 9/3814* (2013.01); *G06F 12/0815* (2013.01); *G06F 12/0868* (2013.01); *G06F 2212/7201* (2013.01)

(58) Field of Classification Search
CPC ............. G06F 12/0246; G06F 12/0815; G06F 12/0868; G06F 9/3814; G06F 2212/7201
See application file for complete search history.

(56) References Cited

U.S. PATENT DOCUMENTS 5,696,929 A * 12/1997 Hasbun ............... G06F 12/0875
711/103
6,092,231 A 7/2000 Sze
(Continued)

FOREIGN PATENT DOCUMENTS

TW 201135746 A1 10/2011
TW 201919066 A 5/2019

OTHER PUBLICATIONS

Non-Final Office Action dated Jun. 9, 2021, issued in U.S. Appl. No. 16/786,089.
(Continued)

*Primary Examiner* — Prasith Thammavong
(74) *Attorney, Agent, or Firm* — McClure, Qualey & Rodack, LLP

(57) ABSTRACT

Mapping information management for data storage devices is provided. A controller caches write data issued by a host in a temporary storage and then programs the cached write data from the temporary storage to a non-volatile memory. The controller uses a mapping information format to manage mapping information of logical addresses recognized by the host. As presented in the mapping information format, the values not greater than a first threshold value and mapped to the configuration information storage space of the non-volatile memory are at least partially used to point to the temporary storage, and the values greater than the first threshold value are mapped to the non-volatile memory.

18 Claims, 9 Drawing Sheets

(51) Int. Cl.
*G06F 9/38* (2018.01)
*G06F 12/0868* (2016.01)

(56) References Cited

U.S. PATENT DOCUMENTS

| | | | |
|---|---|---|---|
| 6,606,682 B1* | 8/2003 | Dang | G06F 12/0873 710/22 |
| 8,245,101 B2 | 8/2012 | Olbrich et al. | |
| 8,285,924 B1* | 10/2012 | Cohn | G06F 12/0866 711/113 |
| 9,329,948 B2 | 5/2016 | Li et al. | |
| 9,870,836 B2 | 1/2018 | Ooneda | |
| 10,789,130 B1 | 9/2020 | Horspool et al. | |
| 2002/0165911 A1* | 11/2002 | Gabber | G06F 16/9574 709/203 |
| 2005/0268203 A1 | 12/2005 | Keays et al. | |
| 2007/0079103 A1* | 4/2007 | Mimatsu | G06F 3/0631 711/173 |
| 2009/0077312 A1* | 3/2009 | Miura | G06F 12/0804 711/113 |
| 2009/0228634 A1 | 9/2009 | Nakamura et al. | |
| 2010/0005366 A1 | 1/2010 | Dell et al. | |
| 2010/0250855 A1* | 9/2010 | Watanabe | G06F 12/145 711/126 |
| 2011/0072199 A1* | 3/2011 | Reiter | G06F 12/0246 711/103 |
| 2011/0161784 A1 | 6/2011 | Selinger et al. | |
| 2011/0238629 A1 | 9/2011 | Post et al. | |
| 2011/0320864 A1 | 12/2011 | Gower et al. | |
| 2011/0320914 A1 | 12/2011 | Alves et al. | |
| 2012/0144109 A1* | 6/2012 | Balakrishnan | G06F 12/0871 711/113 |
| 2013/0191703 A1 | 7/2013 | Meaney et al. | |
| 2014/0013182 A1 | 1/2014 | Cheng et al. | |
| 2014/0025921 A1* | 1/2014 | Yuan | G06F 12/0246 711/206 |
| 2014/0108855 A1 | 4/2014 | Gopakumar et al. | |
| 2014/0279941 A1* | 9/2014 | Atkisson | G06F 16/2365 707/690 |
| 2015/0169465 A1* | 6/2015 | Slepon | G06F 3/0659 711/103 |
| 2015/0178201 A1* | 6/2015 | Sampathkumar | G06F 3/06 711/135 |
| 2015/0207807 A1* | 7/2015 | Guo | H04L 63/145 726/24 |
| 2016/0098344 A1* | 4/2016 | Gorobets | G06F 3/0688 711/154 |
| 2016/0098355 A1* | 4/2016 | Gorobets | G06F 12/1009 711/203 |
| 2016/0117252 A1* | 4/2016 | Thangaraj | G06F 12/0871 711/118 |
| 2017/0308473 A1* | 10/2017 | Bassi | G06F 3/067 |
| 2017/0371794 A1 | 12/2017 | Kan | |
| 2018/0203627 A1 | 7/2018 | Gilda et al. | |
| 2018/0275887 A1 | 9/2018 | Yang et al. | |
| 2018/0285258 A1 | 10/2018 | Muchherla et al. | |
| 2019/0004960 A1 | 1/2019 | Wang et al. | |
| 2019/0026224 A1 | 1/2019 | Koo et al. | |
| 2019/0079882 A1 | 3/2019 | Kim et al. | |
| 2019/0108120 A1 | 4/2019 | Kanno | |
| 2019/0138391 A1 | 5/2019 | Hsiao et al. | |
| 2019/0155685 A1 | 5/2019 | Kim | |
| 2019/0347006 A1 | 11/2019 | Yeh et al. | |
| 2020/0233757 A1 | 7/2020 | Ferreira et al. | |
| 2020/0394099 A1 | 12/2020 | Lin et al. | |
| 2020/0409856 A1* | 12/2020 | Navon | G06F 12/0815 |

OTHER PUBLICATIONS

Non-Final Office Action dated Feb. 18, 2021, issued in U.S. Appl. No. 16/786,089.

Non-Final Office Action dated Jun. 30, 2021, issued in U.S. Appl. No. 16/885,627.

Non-Final Office Action dated Sep. 9, 2021, issued in U.S. Appl. No. 16/774,300.

* cited by examiner

| 32-bit Mapping Information | Contents |
|---|---|
| 0x00000000~0x0002FFFF | If lower than 0x4000, pointing to the data cache space 316; If equal to 0x5000, dummy mapping information |
| 0x00030000~0x0005FFFF | SuperBlk1~Pointing to SuperBlk1 |
| 0x00060000~0x0008FFFF | SuperBlk2~Pointing to SuperBlk2 |
| ...... | ...... |

FIG. 4

DATA STORAGE DEVICE AND NON-VOLATILE MEMORY CONTROL METHOD

CROSS REFERENCE TO RELATED APPLICATIONS

This application claims the benefit of U.S. Provisional Application No. 62/862,196, filed on Jun. 17, 2019, the entirety of which is incorporated by reference herein.

This application also claims priority of Taiwan Patent Application No. 108136997, filed on Oct. 15, 2019, the entirety of which is incorporated by reference herein.

BACKGROUND OF THE INVENTION

Field of the Invention

The present invention is related to non-volatile memory control techniques.

Description of the Related Art

There are various forms of non-volatile memory (NVM) for long-term data storage, such as flash memory, magnetoresistive random access memory (RAM), ferroelectric RAM, resistive RAM, spin transfer torque-RAM (STT-RAM), and so on. These non-volatile memories may be used as the storage medium in a data storage device.

With the advancement of technology, the storage capacity of data storage devices has become more and more powerful. Mapping information management techniques for large-sized data storage devices are called for.

BRIEF SUMMARY OF THE INVENTION

Mapping information management for data storage devices is disclosed.

A data storage device in accordance with an exemplary embodiment of the present invention includes a non-volatile memory and a controller configured to control the non-volatile memory. The controller caches write data issued by a host in a temporary storage and then programs the cached write data from the temporary storage to the non-volatile memory. As presented in the mapping information format, the values not greater than a first threshold value and mapped to a configuration information storage space of the non-volatile memory are at least partially used to point to the temporary storage, and the values greater than the first threshold value are mapped to the non-volatile memory.

In an exemplary embodiment, no pattern mode bits are reserved in the mapping information format.

In an exemplary embodiment, a second threshold value lower than the first threshold value is provided, wherein the second threshold value depends on the size of a data cache space within the temporary storage. As presented in the mapping information format, the values lower than the second threshold value point to the data cache space.

In an exemplary embodiment, a preset value not greater than the first threshold value and not lower than the second threshold value is provided. The preset value presented in the mapping information format is dummy mapping information.

In an exemplary embodiment, when an obtained value presented in the mapping information format is greater than the first threshold value, the controller uses a pre-determined number as a divisor to perform a division operation and a modulo operation on the obtained value to calculate a quotient and a remainder. The non-volatile memory is divided into a plurality of big units, and each big unit is divided into a plurality of small units. The quotient corresponds to a big unit number which indicates a big unit corresponding to the obtained value. The remainder corresponds to a small unit number which indicates a small unit corresponding to the obtained value.

In an exemplary embodiment, the controller manages a mapping information history table on the temporary storage. The mapping information history table has mapping information entries corresponding to cache entries of the data cache space. Each mapping information entry records the previous physical address, in the mapping information format, of cached data in the corresponding cache entry.

In an exemplary embodiment, corresponding to a target logical address having data cached in the data cache space, the controller uses the temporary storage to record the latest mapping information in the mapping information format.

In an exemplary embodiment, a first cache entry and a second cache entry of the data cache space have two versions of cached data corresponding to the target logical address, and the latest mapping information of the target logical address points to the second cache entry of the data cache space. Corresponding to the first cache entry of the data cache space, the mapping information history table has a first mapping information entry pointing to the non-volatile memory. Corresponding to the second cache entry of the data cache space, the mapping information history table has a second mapping information entry pointing to the first cache entry of the data cache space. According to the latest mapping information, the controller checks the second mapping information entry and then is directed to check the first mapping information entry. Based on the first mapping information entry pointing to the non-volatile memory, the controller determines that the first cache entry stores the oldest version of cached data of the target logical address. The controller programs the oldest version of cached data of the target logical address to the non-volatile memory and changes the second mapping information entry to point to the non-volatile memory.

In an exemplary embodiment, according to the latest mapping information, the controller checks and determines that the second mapping information entry points to the non-volatile memory, determines that the second cache entry stores the oldest version of cached data of the target logical address, programs the oldest version of cached data of the target logical address from the second cache entry to the non-volatile memory, and updates the latest mapping information to point to the non-volatile memory.

The aforementioned controller may be implemented in other architectures. The foregoing concept can be used to implement a non-volatile memory control method.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 4 shows a table 400, which lists the various meanings represented by the different values presented in the mapping information format 210:

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics which are described below.

The host side distinguishes data by logical addresses (for example, logical block addresses LBAs or global host page numbers GHPs . . . ). As for where the data is actually stored in the flash memory, it is managed by mapping information.

Figure 1:
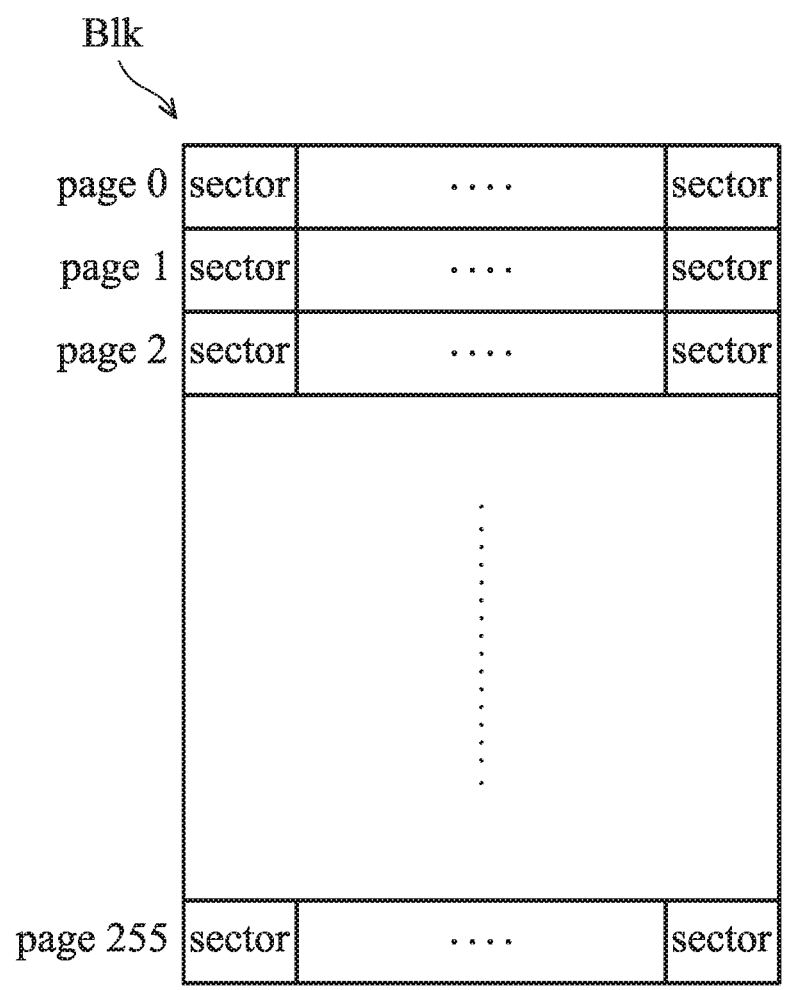
FIG. 1 illustrates the architecture of one block BLK.

The physical space of a flash memory is divided into a plurality of blocks. FIG. 1 illustrates the architecture of one block BLK, which includes a plurality of pages (e.g., page 0 to page 255). One implementation is to sequentially program a block according to the page number (from low to high). Each page includes a plurality of sectors (e.g., 32 sectors per page), each sector may store 512B user data. A single write may cover multiple sectors. In a 4 KB data management mode, each data unit covers 8 sectors (4 KB) and the 8 sectors are managed together. A 16 KB page stores four data units (32 sectors). The four data units may correspond to four discontinuous logical addresses.

In particular, data is not updated to the storage space of the old data. The new version of the data must be written into a blank space and the old data is invalidated. A block may only have sporadic valid data remained. As a block cannot be reused until being erased, the spare blocks are gradually consumed. When the number of spare blocks is insufficient (for example, less than a threshold amount), a garbage collection demand occurs. Sporadic valid data in a block is collected into another block through garbage collection. Blocks with only invalid data remained is erased and released, and so that the number of spare blocks is increased to ensure the normal use of the flash memory. However, the garbage collection may result in logical non-sequential data (fragmented) within the same block.

As can be seen from the foregoing, the space allocation of the flash memory is quite complicated. In an exemplary embodiment, a logical-to-physical address mapping table (L2P mapping table) is established, winch maps logical addresses recognized at the host side to physical addresses of the flash memory.

In an exemplary embodiment, the data issued from the host is first cached in the temporary storage before being written to the flash memory. The data is moved from the temporary storage to the flash memory when a specific condition is met (for example, the cached data reaches a certain amount, or when a certain time is passed). Therefore, some logical addresses are mapped to the temporary storage. A pattern mode is set to point to the temporary storage or the flash memory. The conventional mapping information format includes reserved bits for setting the pattern mode. The mapping information format in the present invention does not need the reserved pattern mode bits.

Figure 2A:
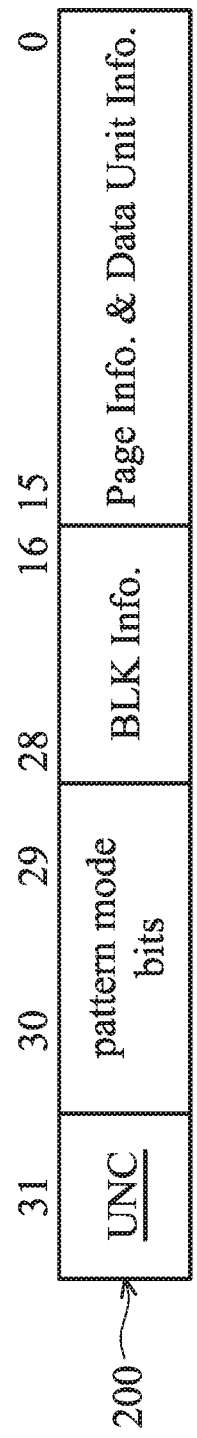
FIG. 2A illustrates a mapping information format 200 used in the conventional technology.

FIG. 2A illustrates a mapping information format 200 used in the conventional technology, including 32 bits (four bytes). The conventional mapping information format 200 includes:

Bit [31], a UNC bit, reserved for an uncorrectable (UNC) command defined by non-volatile memory express interface (NVMe);

Bits [30:29], reserved for setting the pattern mode, wherein '00' or '01' represents that the subsequent bits [28:0] shows a physical address of the flash memory, and '10' represents that the subsequent bits [28:0] shows a physical address of the temporary storage, '11' represents that the following bits [28:0] shows dummy mapping information; and Bits [28:0], showing the physical address of the flash memory or the temporary storage, or showing dummy mapping information.

In the conventional mapping information format 200, bits [30:29] are pattern mode bits and a UNC bit is required. Thus, only 29 bits can be used to indicate a physical address. The 29 bits is quite sufficient for the traditional data storage devices which are limited in size. The block information may be represented by bits [28:16] without overlapping bits [15:0] which shows the page information and data unit information.

For example, a value u32H2F presented in the conventional mapping information format 200 can be transformed to physical information as follows:

if u32H2F & 0x60000000=0x60000000, u32H2F contains dummy mapping information:

if u32H2F & 0x60000000=0x40000000, u32H2F contains physical address of the temporary storage:

if u32H2F & 0x60000000=0, u32H2F contains physical address of the flash memory.

When determining that u32H2F contains physical address of the flash memory, the physical address of the flash memory is extracted from u32H2F as follows:
((u32H2F & 0x1FFFFFFF)>>18), wherein block information (e.g. a block number Blk #) is obtained by the logical AND operation and the logical shift operation.
(u32H2F & 0x3FFF), wherein page information Page # and data unit information Unit # are obtained by the logical AND operation, and the calculated result may be a page number and a data unit number, or, in another example, an offset value is calculated.

Figure 2B:
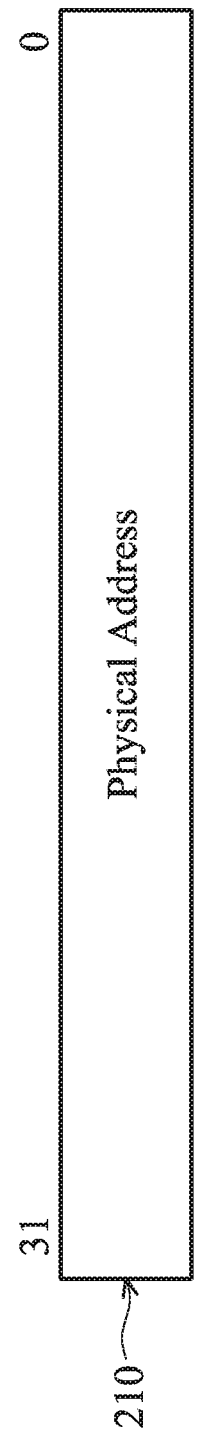
FIG. 2B illustrates a mapping information format 210 in accordance with an exemplary embodiment of the present invention.

FIG. 2B illustrates a mapping information format 210 in accordance with an exemplary embodiment of the present invention, which includes 32 bits (four bytes), but does not reserve the UNC bit and pattern mode bits. More details are discussed in the following sections.

Figure 3:
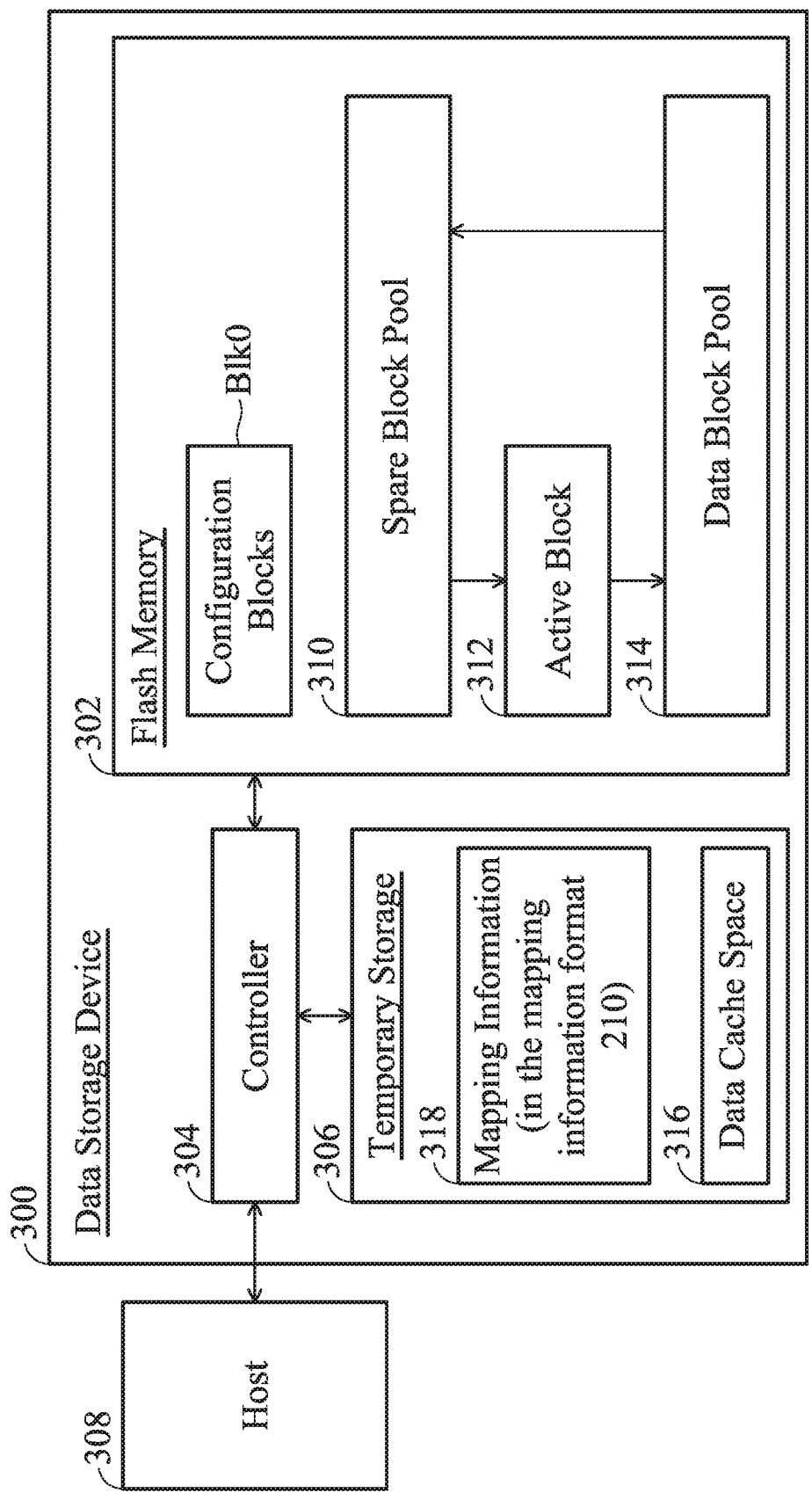
FIG. 3 is a block diagram illustrating a data storage device 300 in accordance with an exemplary embodiment of the present invention.

FIG. 3 is a block diagram illustrating a data storage device 300 in accordance with an exemplary embodiment of the present invention, which includes a flash memory 302, a controller 304, and a temporary storage 306. The host 308 operates the flash memory 302 through the controller 304. Within the data storage device 300, the controller 304 may spontaneously initiate the optimization of the flash memory 302, such as arranging the space of the flash memory 302 to maximize the storage performance. The controller 304 uses the temporary storage 306 to temporarily store the data required during calculations. The temporary storage 306 may be a dynamic random access memory (DRAM) or a static random access memory (SRAM).

The flash memory 302 includes a plurality of blocks. The active block 312 taken from the spare block pool 310 is used to program the write data issued by the host 308. After the programming of the active block 312 is completed, the active block 312 is pushed into the data block pool 314 as a data block. A data block may be released by garbage collection and pushed back to the spare block pool 310.

In particular, the flash memory 302 has at least one configuration block Blk0 that stores configuration information of the flash memory 302. The configuration block Blk0 is protected from user data programming. When the system is powered on, the host 308 requests for the data of the logical block LBA0 and, accordingly, the controller 304 reads the configuration block Blk0. The controller 304 obtains configuration information from the configuration block Blk0 and operates the flash memory 302 based on the obtained configuration information.

Since the configuration block Blk0 is not dynamically mapped to user data, the physical address of the configuration block Blk0 is utilized to represent the space of the temporary storage 306.

As shown, the controller 304 first caches data in a data cache space 316 of the temporary storage 306, and then programs the cached data from the data cache space 316 to the active block 312. The temporary storage 306 is also responsible for the dynamic update of the mapping information (space 318), in which the mapping information is recorded in the mapping information format 210 that contains no pattern mode bits.

FIG. 4 shows a table 400, which lists the various meanings represented by the different values presented in the mapping information format 210.

In an exemplary embodiment, the data storage device 300 uses a multi-channel technology. The different channels each provide a block to form a super block. A super block is formed by super pages and each super page is formed by pages from the different channels. Data erasure may be performed in units of super blocks. Data programming may be performed in units of super pages. Data throughput is improved by the multi-channel design. The number of data units included in each superblock UnitPerSuperBlk, is 0x300000. SuperBlk0 includes configuration blocks Blk0 of all channels, and the corresponding 32-bit physical addresses 0x00000000~0x0002FFFF are used to point to the data cache space 316 or to represent dummy mapping information. In an exemplary embodiment, the data cache space 316 is 64 MB (=4 KB*$2^{14}$). When data is managed in units of 4 KB, 14 bits are required to address the data cache space 316 (e.g., 0x000~0x3FFF). Values presented in the mapping information format 210 and less than 0x4000 represent the data cache space 316 (e.g., interpreted as a physical address of the temporary storage 306). Dummy mapping information may be represented by 0x5000 (or another unused value from 0x4000 to x3FFF).

Values greater or equal to 0x00030000 are the physical addresses of the flash memory 302. For example, 0x00030000~0x005FFFF point to SuperBlk1, 0x00060000~0x0008FFFF point to SuperBlk2, and so on.

In an exemplary embodiment, data is managed in units of 4 KB and the capacity of the flash memory 302 is 16 TB (4 KB*$2^{32}$). Thus, 32 bits are required to identify the different data units. The mapping information format 210 can fully meet such a requirement. The design details can be adjusted depending on the actual storage capacity and the storage structure.

Figure 5:
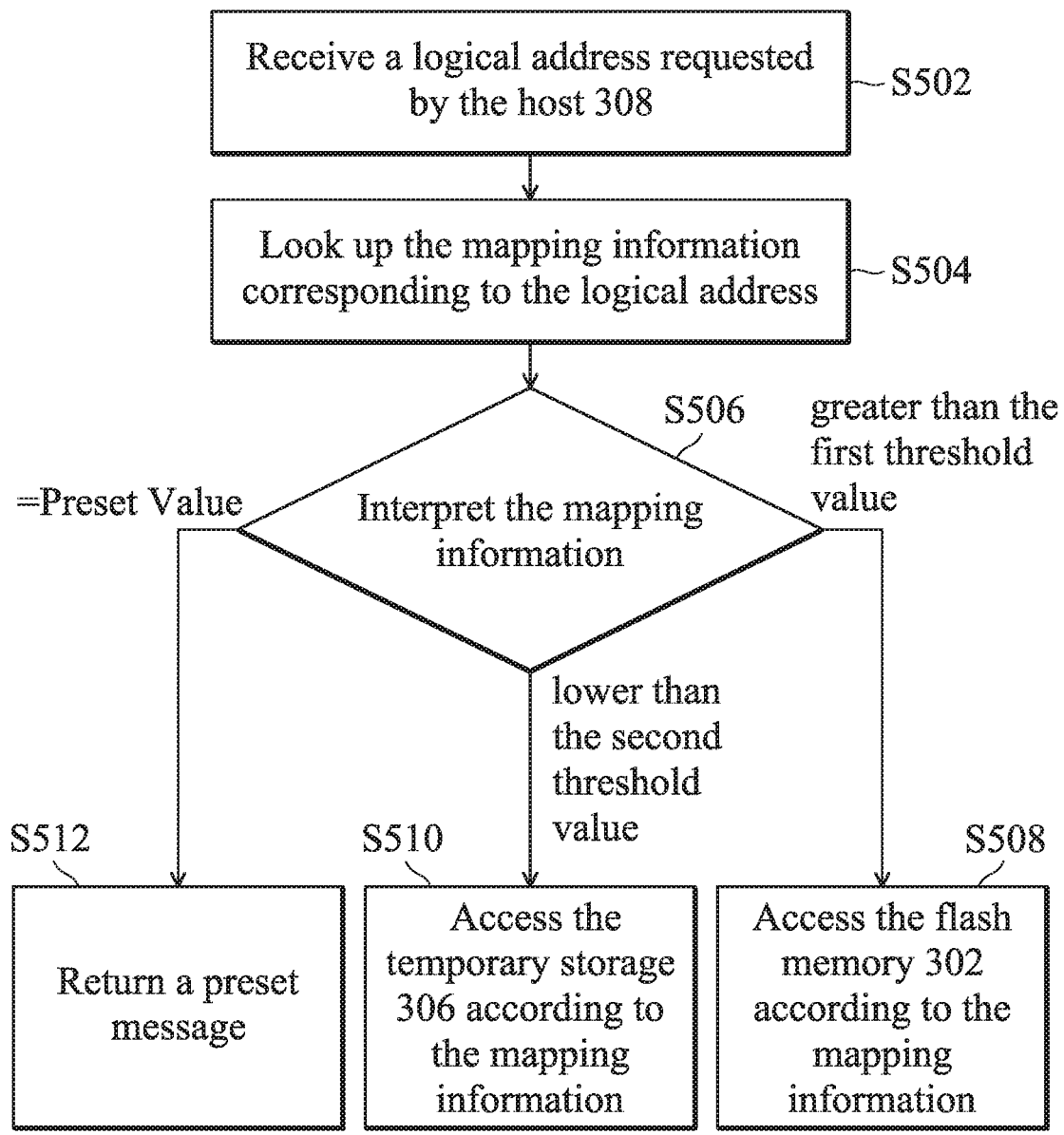
FIG. 5 is a flowchart illustrating the operations of the controller 304 in accordance with an exemplary embodiment of the present invention.

FIG. 5 is a flowchart illustrating the operations of the controller 304 in accordance with an exemplary embodiment of the present invention.

In step S502, the controller 304 receives a logical address requested by the host 308.

In step S504, the controller 304 looks up the mapping information corresponding to the logical address. For example, a 32-bit value u32H2F is obtained in step S504.

In step S506, the controller 304 interprets the mapping information. When the 32-bit value u32H2F is higher than 0x8000 (the first threshold), the controller 304 determines that the 32-bit value u32H2F indicates the physical address of the flash memory 302, and the flow proceeds to step S508. When the 32-bit value u32H2F is lower than 0x4000 (the second threshold), the controller 304 determines that the 32-bit value u32H2F indicates the physical address of the temporary storage 306, and the flow proceeds to step S510. When the 32-bit value u32H2F is equal to 0x5000 (a preset value), the controller 304 determines that the 32-bit value u32H2F indicates dummy mapping information, and the flow proceeds to step S512. The first threshold depends on the size of the configuration blocks, the second threshold depends on the size of the data cache space 316, the first threshold is greater than the second threshold, and the preset value (0x5000) may be any value between the first threshold and the second threshold.

In step S508, the controller 304 accesses the flash memory 302 according to the mapping information. The controller 304 may perform division or modulo operation on the 32-bit value u32H2F to obtain physical information such as a superblock number SuperBlk #, a channel number CH #, a page number Page #, and data unit number Unit #. For example:
u32H2F/UnitPerSuperBlk, which is a division operation and the quotient is a superblock number SuperBlk #; or u32H2F % UnitPerSuperBlk, which is a modulo operation and the remainder may contain information of the channel number CH #, page number Page #, and data unit number Unit #.

With the calculated information, the controller 304 can correctly access the flash memory 302.

In step S510, the controller 304 accesses the temporary storage 306 according to the mapping information. In this case, the controller 304 interprets the 32-bit value u32H2F as a physical address of the temporary storage 306 that points to the data cache space 316.

In step S512, the controller 304 returns a preset message. In this case, the 32-bit value u32H2F indicates dummy mapping information, the controller 304 reports the preset message to the host 308 that the requested logical address has no corresponding record or has been cleared.

Based on the mapping information format 210, the controller 304 further performs a special procedure to use the space 318 of the temporary storage 306 to update the mapping information. FIGS. 6A to 6D illustrate the contents dynamically managed in the temporary storage 306. The update of data of the logical address LBA10 is taken as an example. Before being programmed to the flash memory 302, data is cached in the data cache space 316. A mapping information history table 602 and the latest mapping information 604 are dynamically managed in the space 318.

The mapping information history table 602 has mapping information entries corresponding to cache entries of the data cache space 316. Each mapping information entry records the previous physical address, in the mapping information format 210, of cached data in the corresponding cache entry. Corresponding to the logical address LBA10, the controller 304 records the latest mapping information 604, in the mapping information format 210, in the space 318.

Figure 6A:
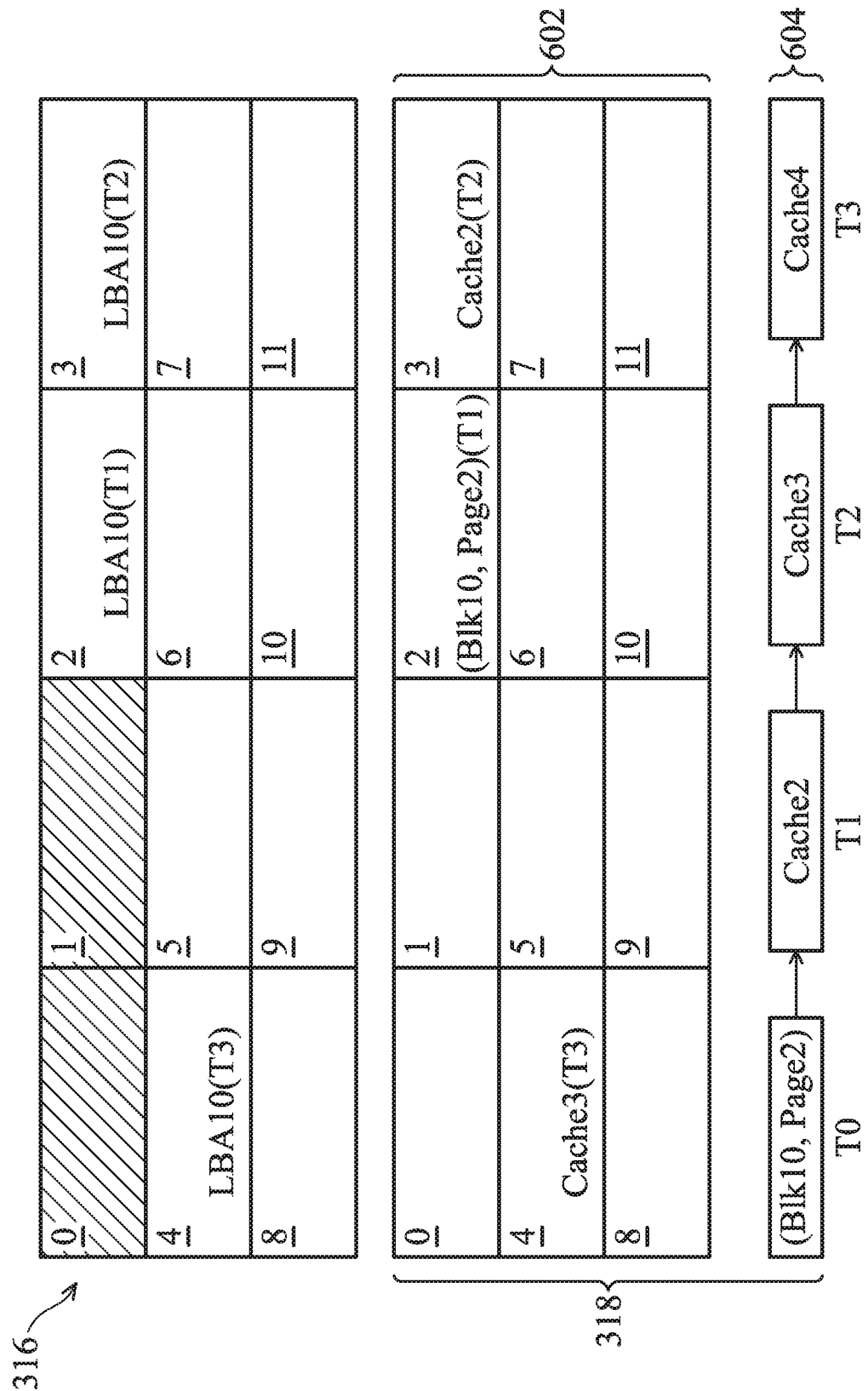
FIGS. 6A to 6D illustrate the contents dynamically managed in the temporary storage 306, wherein the update of data of the logical address LBA10 is taken as an example.

Referring to FIG. 6A, the latest mapping information 604 at time T0 shows that the data recognized by the logical address LBA10 is at the physical address (Blk10, page2) of the flash memory 302 in a non-volatile manner. At time T1, T2, and T3, the data recognized by the logical address LBA10 is updated multiple times and is sequentially cached in indexes 2, 3, and 4 cache entries of the data cache space 316, the latest mapping information 604 is updated three times, and the mapping information history is filled into the mapping information history table 602 corresponding to indexes 2, 3, and 4.

At time T1, the data of LBA10 is cached in the index 2 cache entry of the data cache space 316. The previous physical address, (Blk10, page2) at T0, originally recorded as the latest mapping information 604 is copied to the index 2 mapping information entry of the mapping information history table 602. The latest mapping information 604 is updated to point to the index 2 cache entry, Cache2, of the data cache space 316 that stores the cached version of LBA10 at time TL.

At time T2, the data of LBA10 is cached in the index 3 cache entry of the data cache space 316. The previous physical address, Cache2 at T1, originally recorded as the latest mapping information 604 is copied to the index 3 mapping information entry of the mapping information history table 602. The latest mapping information 604 is updated to point to the index 3 cache entry. Cache3, of the data cache space 316 that stores the cached version of LBA10 at time T2.

At time T3, the data of LBA10 is cached in the index 4 cache entry of the data cache space 316. The previous physical address, Cache3 at T2, originally recorded as the latest mapping information 604 is copied to the index 3 mapping information entry of the mapping information history table 602. The latest mapping information 604 is updated to point to the index 4 cache entry, Cache4, of the data cache space 316 that stores the cached version of LBA10 at time T3.

Figure 6B:
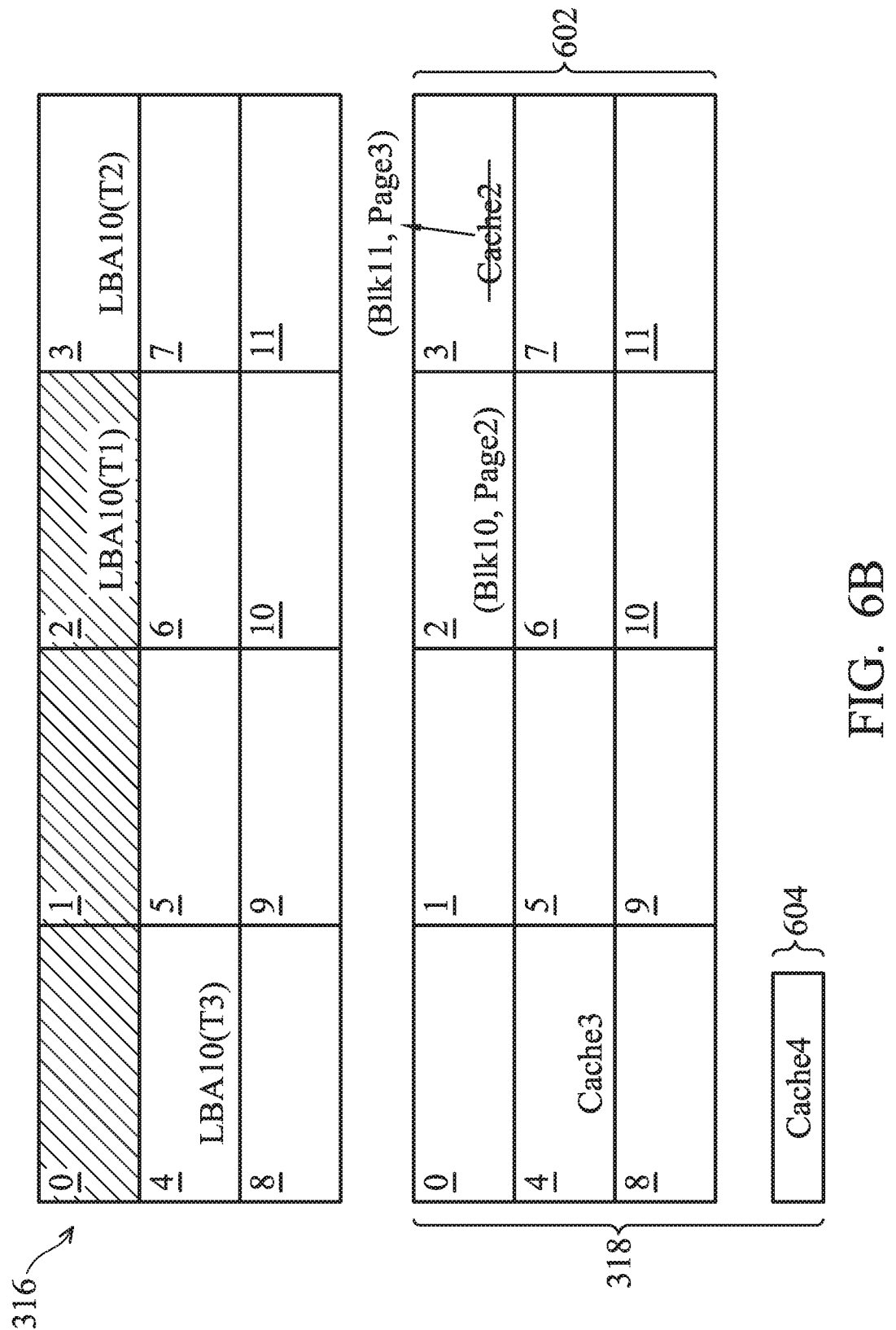
Figure 6C:
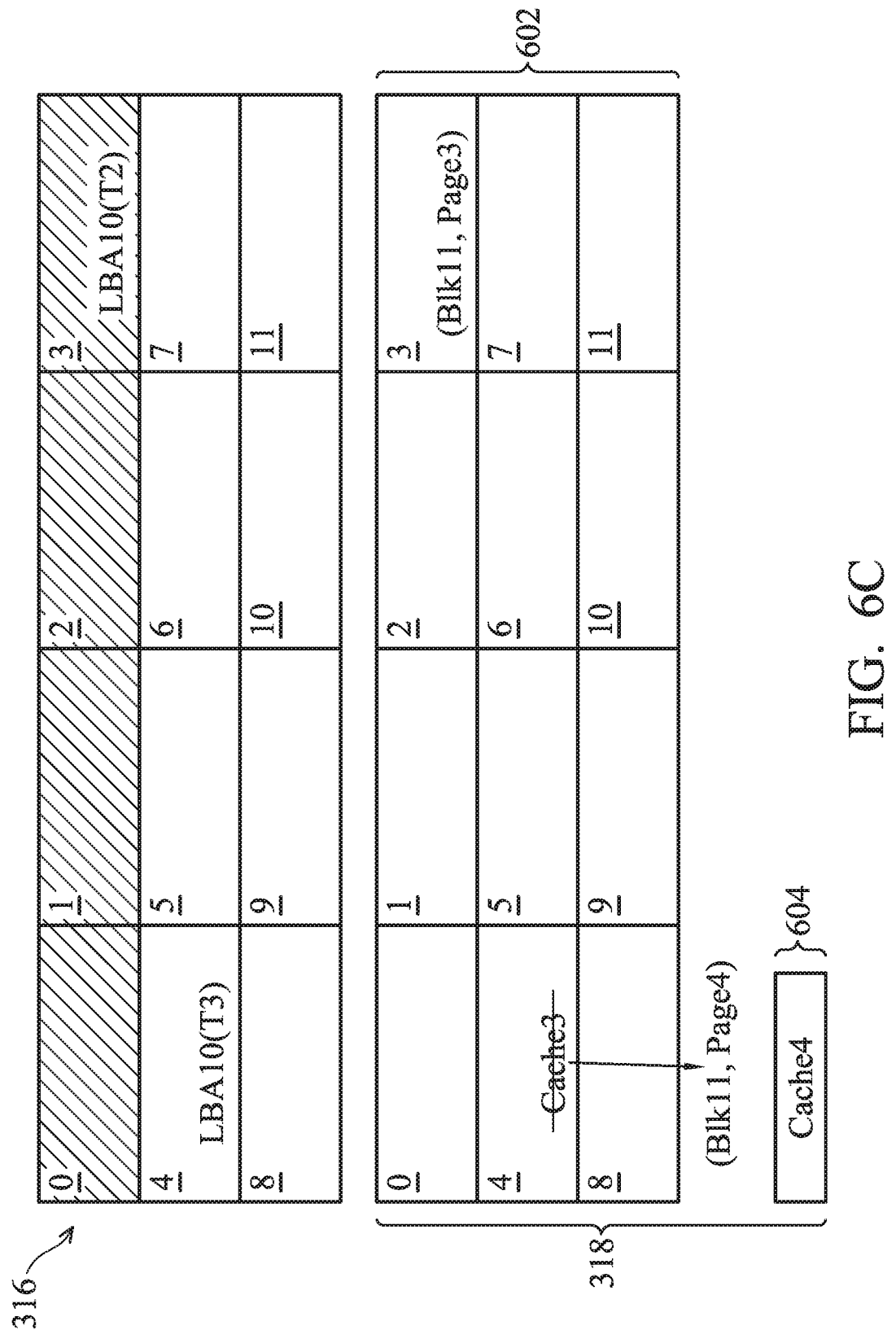
Figure 6D:
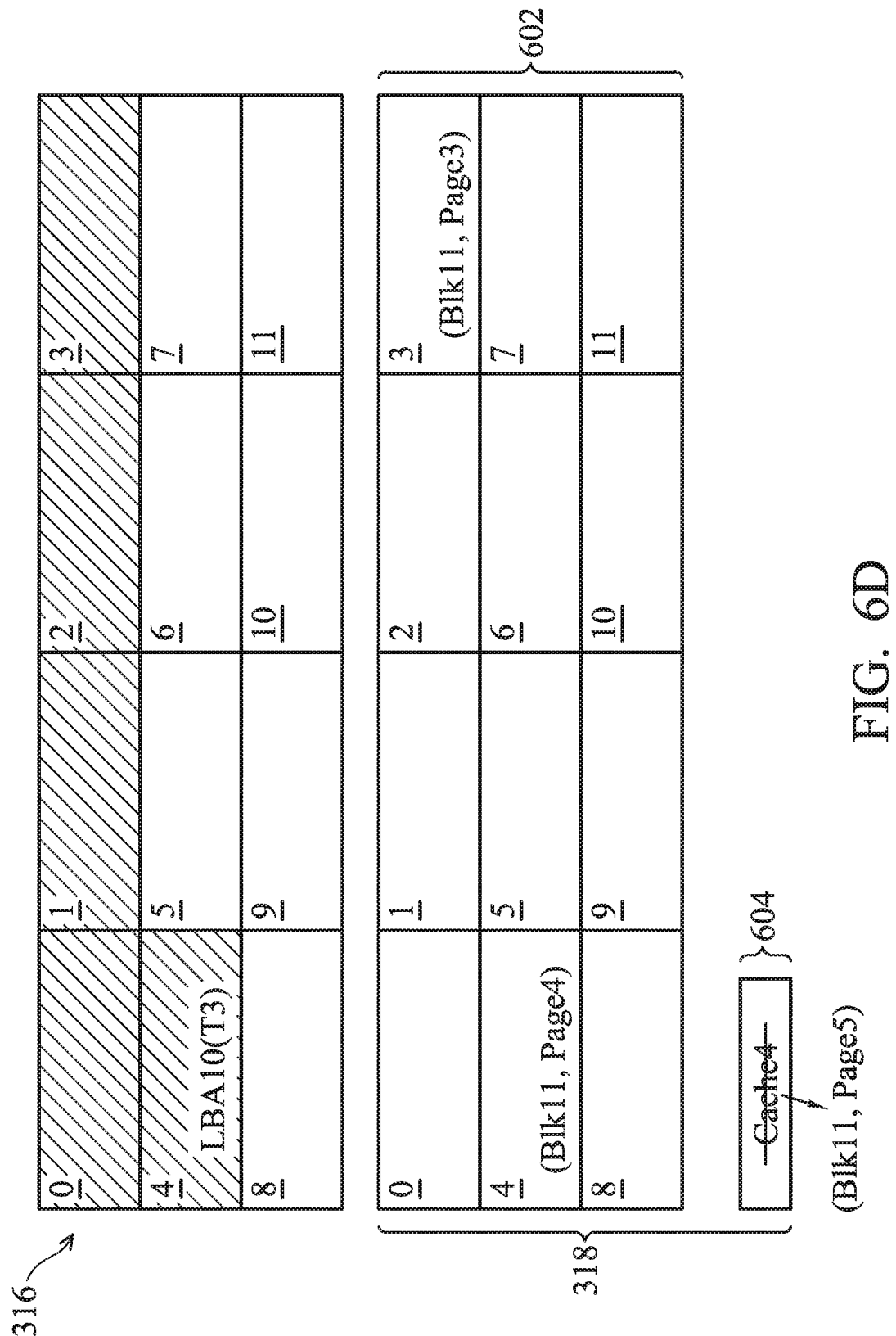

In FIGS. 6B to 6D, the controller 304 programs the cached data into the flash memory 302.

Referring to FIG. 6B, when the controller 304 programs the data corresponding to LBA10 and cached in the index 2 cache entry of the data cache space 316 to the flash memory 302, several steps are performed. Based on the latest mapping information 604, the controller 304 determines that the latest data of LBA10 is cached in the index 4 cache entry of the data cache space 316, and reads the index 4 mapping information entry of the mapping information history table 602 to get the physical address of Cache3. Corresponding to the index 3 cache entry of the data cache space 316 (Cache3), the controller 304 reads the index 3 mapping information entry of the mapping information history table 602 to get the physical address of Cache2. Corresponding to the index 2 cache entry of the data cache space 316 (Cache2), the controller 304 reads the index 2 mapping information entry of the mapping information history table 602 to get the physical address of (Blk10, Page2). The controller 304 thus determines that the oldest cached version of LBA10 not been programmed to the flash memory 302 is the data cached in index 2 cache entry of the data cache space 316. The controller 304 programs the data cached in the index 2 cache entry of the data cache space 316 to (Blk11, Page3) of the flash memory 302. The controller 304 reduces the valid page count of the block Blk10 by one and increases the valid page count of the block Blk11 by one. The controller 304 further changes the index 3 mapping information entry of the mapping information history table 602 from pointing to Cache2 to pointing to (Blk11, Page3).

Referring to FIG. 6C, when the controller 304 programs the data corresponding to LBA10 and cached in the index 3 cache entry of the data cache space 316 to the flash memory 302, several steps are performed. Based on the latest mapping information 604, the controller 304 determines that the latest data of LBA10 is cached in the index 4 cache entry of the data cache space 316, and reads the index 4 mapping information entry of the mapping information history table 602 to get the physical address of Cache3. Corresponding to the index 3 cache entry of the data cache space 316 (Cache3), the controller 304 reads the index 3 mapping information entry of the mapping information history table 602 to get the physical address (Blk11, Page3). The controller 304 thus determines that the oldest cached version of LBA10 not been programmed to the flash memory 302 is the data cached in the index 3 cache entry of the data cache space 316. The controller 304 programs the data cached in the index 3 cache entry of the data cache space 316 to (Blk11, Page4) of the flash memory 302. The controller 304 reduces the valid page count of the block Blk11 by one and then adds one back to the valid page count of the block Blk11. The controller 304 further changes the index 4 mapping information entry of the mapping information history table 602 from pointing to Cache3 to pointing to (Blk11, Page4).

Referring to FIG. 6D, when the controller 304 programs the data corresponding to LBA10 and cached in the index 4 cache entry of the data cache space 316 to the flash memory 302, several steps are performed. Based on the latest mapping information 604, the controller 304 determines that the latest data of LBA10 is cached in the index 4 cache entry of the data cache space 316, and reads the index 4 mapping information entry of the mapping information history table 602 to get the physical address (Blk11, Page4). The controller 304 thus determines that the oldest cached version of LBA10 not been programmed to the flash memory 302 is the data cached in index 4 cache entry of the data cache space 316. The controller 304 programs the data cached in the index 4 cache entry of the data cache space 316 to (Blk11, Page5) of the flash memory 302. The controller 304 reduces the valid page count of the block Blk11 by one and then adds one back to the valid page count of the block Blk11. The controller 304 further changes the latest mapping information 604 from pointing to Cache4 to pointing to (Blk11, Page5).

The above example shows that, the physical addresses of the data cache space 316 and the physical addresses of the flash memory 302 all can be clearly presented in the mapping information format 210. In particular, to identify the different versions of the cached data, both the latest cache position and the oldest cache position have to be monitored in the traditional techniques. However, the present invention only needs the latest mapping information 604. The oldest cache position can be obtained by performing simple logical operations.

The memory controller 304 controlling the flash memory 302 may be implemented in other architectures. Any techniques using the forgoing concepts to manage mapping information with no reserved pattern mode bits are in the scope of the present invention. In some exemplary embodiments, control methods for non-volatile memory may be realized based on the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory;
a controller, configured to control the non-volatile memory,
wherein:
the controller caches write data issued by a host in a temporary storage and then programs the cached write data from the temporary storage to the non-volatile memory;
the controller uses a mapping information format to manage mapping information of logical addresses recognized by the host; and
as presented in the mapping information format, physical addresses not greater than a first threshold value and mapped to a configuration information storage space of the non-volatile memory are at least partially used to point to the temporary storage, and physical addresses greater than the first threshold value are mapped to the non-volatile memory.

2. The data storage device as claimed in claim 1, wherein:
no pattern mode bits are reserved in the mapping information format.

3. The data storage device as claimed in claim 2, wherein:
a second threshold value lower than the first threshold value is provided, wherein the second threshold value depends on a size of a data cache space within the temporary storage; and
physical addresses, presented in the mapping information format and lower than the second threshold value, point to the data cache space.

4. The data storage device as claimed in claim 3, wherein:
a preset value of physical address not greater than the first threshold value and not lower than the second threshold value is provided; and
the preset value of physical address presented in the mapping information format is dummy mapping information.

5. The data storage device as claimed in claim 4, wherein:
when an obtained physical address presented in the mapping information format is greater than the first threshold value, the controller uses a pre-determined number as a divisor to perform a division operation and a modulo operation on the obtained physical address to calculate a quotient and a remainder;
the non-volatile memory is divided into a plurality of big units, and each big unit is divided into a plurality of small units;
the quotient corresponds to a big unit number which indicates a big unit corresponding to the obtained physical address; and
the remainder corresponds to a small unit number which indicates a small unit corresponding to the obtained physical address.

6. The data storage device as claimed in claim 4, wherein:
the controller manages a mapping information history table on the temporary storage;
the mapping information history table has mapping information entries corresponding to cache entries of the data cache space;
each mapping information entry records a previous physical address, in the mapping information format, of cached data in the corresponding cache entry.

7. The data storage device as claimed in claim 6, wherein:
corresponding to a target logical address having data cached in the data cache space, the controller uses the temporary storage to record latest mapping information in the mapping information format.

8. The data storage device as claimed in claim 7, wherein:
a first cache entry and a second cache entry of the data cache space have two versions of cached data corresponding to the target logical address, and the latest mapping information of the target logical address points to the second cache entry of the data cache space;
corresponding to the first cache entry of the data cache space, the mapping information history table has a first mapping information entry pointing to the non-volatile memory;
corresponding to the second cache entry of the data cache space, the mapping information history table has a second mapping information entry pointing to the first cache entry of the data cache space;
according to the latest mapping information, the controller checks the second mapping information entry and then is directed to check the first mapping information entry;
based on the first mapping information entry pointing to the non-volatile memory, the controller determines that the first cache entry stores a version of cached data of the target logical address that is the oldest; and the controller programs the oldest version of cached data of the target logical address to the non-volatile memory and changes the second mapping information entry to point to the non-volatile memory.

9. The data storage device as claimed in claim 8, wherein: according to the latest mapping information, the controller checks the second mapping information entry and determines that the second mapping information entry points to the non-volatile memory, determines that the second cache entry stores an oldest version of cached data of the target logical address, programs the oldest version of cached data of the target logical address from the second cache entry to the non-volatile memory, and updates the latest mapping information to point to the non-volatile memory.

10. A non-volatile memory control method, comprising:
caching write data issued by a host in a temporary storage and then programming the cached write data from the temporary storage to the non-volatile memory; and
using a mapping information format to manage mapping information of target logical addresses recognized by the host,
wherein:
as presented in the mapping information format, physical addresses not greater than a first threshold value and mapped to a configuration information storage space of the non-volatile memory are at least partially used to point to the temporary storage, and physical addresses greater than the first threshold value are mapped to the non-volatile memory.

11. The non-volatile memory control method as claimed in claim 10, wherein:
no pattern mode bits are reserved in the mapping information format.

12. The non-volatile memory control method as claimed in claim 11, wherein:
a second threshold value lower than the first threshold value is provided, wherein the second threshold value depends on a size of a data cache space within the temporary storage; and
physical addresses, presented in the mapping information format and lower than the second threshold value, point to the data cache space.

13. The non-volatile memory control method as claimed in claim 12, wherein:
a preset value of physical address not greater than the first threshold value and not lower than the second threshold value is provided; and
the preset value of physical address presented in the mapping information format is dummy mapping information.

14. The non-volatile memory control method as claimed in claim 13, wherein:
when an obtained physical address presented in the mapping information format is greater than the first threshold value, a pre-determined number is used as a divisor to perform a division operation and a modulo operation on the obtained physical address to calculate a quotient and a remainder;
the non-volatile memory is divided into a plurality of big units, and each big unit is divided into a plurality of small units;

the quotient corresponds to a big unit number which indicates a big unit corresponding to the obtained physical address; and
the remainder corresponds to a small unit number which indicates a small unit corresponding to the obtained physical address.

15. The non-volatile memory control method as claimed in claim 13, further comprising:
managing a mapping information history table on the temporary storage,
wherein:
the mapping information history table has mapping information entries corresponding to cache entries of the data cache space;
each mapping information entry records a previous physical address, in the mapping information format, of cached data in the corresponding cache entry.

16. The non-volatile memory control method as claimed in claim 15, further comprising:
corresponding to a target logical address having data cached in the data cache space, using the temporary storage to record a latest mapping information in the mapping information format.

17. The non-volatile memory control method as claimed in claim 16, wherein:
a first cache entry and a second cache entry of the data cache space have two versions of cached data corresponding to the target logical address, and the latest mapping information of the target logical address points to the second cache entry of the data cache space;
corresponding to the first cache entry of the data cache space, the mapping information history table has a first mapping information entry pointing to the non-volatile memory;
corresponding to the second cache entry of the data cache space, the mapping information history table has a second mapping information entry pointing to the first cache entry of the data cache space;
according to the latest mapping information, the second mapping information entry is checked and then the first mapping information entry due to the second mapping information entry;
based on the first mapping information entry pointing to the non-volatile memory, the first cache entry is determined storing an oldest version of cached data of the target logical address; and
the oldest version of cached data of the target logical address is programmed to the non-volatile memory and the second mapping information entry is updated to point to the non-volatile memory.

18. The non-volatile memory control method as claimed in claim 17, further comprising:
according to the latest mapping information, checking the second mapping information entry and determining that the second mapping information entry points to the non-volatile memory, determining that the second cache entry stores an oldest version of cached data of the target logical address, programming the oldest version of cached data of the target logical address from the second cache entry to the non-volatile memory, and updating the latest mapping information to point to the non-volatile memory.

* * * * *